US008377617B2

(12) United States Patent
Kouyama et al.

(10) Patent No.: US 8,377,617 B2
(45) Date of Patent: Feb. 19, 2013

(54) TONER FOR DEVELOPING ELECTROSTATIC IMAGE AND MANUFACTURING METHOD OF TONER FOR DEVELOPING ELECTROSTATIC IMAGE

(75) Inventors: Mikio Kouyama, Tokyo (JP); Hiroshi Yamazaki, Tokyo (JP); Ken Ohmura, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 13/285,046

(22) Filed: Oct. 31, 2011

(65) Prior Publication Data

US 2012/0123075 A1 May 17, 2012

(30) Foreign Application Priority Data

Nov. 16, 2010 (JP) ................................. 2010-255617

(51) Int. Cl.
*G03G 9/087* (2006.01)
*C08L 31/02* (2006.01)

(52) U.S. Cl. ...................... 430/109.3; 524/563; 524/564

(58) Field of Classification Search ............... 430/109.3; 524/563, 564

See application file for complete search history.

(56) References Cited

U.S. PATENT DOCUMENTS

| | | | |
|---|---|---|---|
| 2004/0137351 | A1 | 7/2004 | Sato |
| 2010/0003613 | A1 | 1/2010 | Honda |
| 2010/0055603 | A1 | 3/2010 | Nozaki |

FOREIGN PATENT DOCUMENTS

| | | |
|---|---|---|
| DE | 196-11-731 | 4/1997 |
| JP | 2007-279714 | 10/2007 |
| JP | 2008-287229 | 11/2008 |
| JP | 2010-015159 | 1/2010 |

OTHER PUBLICATIONS

European Search Report EP 11 18 8006 (4 pages), Feb. 7, 2012.

*Primary Examiner* — Vu A Nguyen
(74) *Attorney, Agent, or Firm* — Lucas & Mercanti, LLP

(57) ABSTRACT

Disclosed are a toner for developing an electrostatic image and its manufacturing method, the toner being comprised of toner particles, wherein the toner particles contain as a resin a polymer having a structural unit represented by the following formula 1, Formula 1

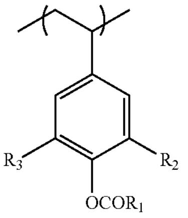

wherein $R_1$ represents an alkyl group having a carbon atom number of from 1 to 8, which may have a substituent; and $R_2$ and $R_3$ independently represent a hydrogen atom, $—OR_4$ or $—OCOR_5$, in which $R_4$ and $R_5$ independently represent an alkyl group having a carbon atom number of from 1 to 8, provided that at least one of $R_2$ and $R_3$ is $—OR_4$ or $—OCOR_5$.

13 Claims, No Drawings

TONER FOR DEVELOPING ELECTROSTATIC IMAGE AND MANUFACTURING METHOD OF TONER FOR DEVELOPING ELECTROSTATIC IMAGE

This application is based on Japanese Patent Application No. 2010-255617, filed on Nov. 16, 2010 in Japanese Patent Office, the entire content of which is hereby incorporated by reference.

FIELD OF THE INVENTION

The present invention relates to a toner for developing an electrostatic image and a manufacturing method of a toner for developing an electrostatic image.

TECHNICAL BACKGROUND

In recent years, reduction of electric power consumption, high speed printing, variations of a recording medium, image quality improvement and reduction of environmental load have been required in a printing field in which image formation is carried out according to electro-photography. The toner employed for image formation has been required to have increased fixing strength and a low temperature fixing ability such that a toner image can be fixed at a temperature lower than a conventional fixing temperature, and to realize reduction of carbon dioxide evolution during the manufacture.

The toner usually comprises a resin having a binding ability (a toner binder). As the toner binders, there are known a styrene-acryl resin, a polyester resin, and a hybrid resin such as a polyester resin with an acryl resin grafted.

In response to the demand as described above, a technology is known which improves the toner binders, thereby improving low temperature fixing ability of the toner (refer to Japanese Patent O.P.I. Publication Nos. 2007-279714, 2008-287229 and 2010-15159).

Generally, the styrene-acryl resin has advantage in that it can be synthesized at a low temperature as compared with the polyester resin. Further, the styrene-acryl resin has advantage in that a toner manufacturing process from polymerization of the monomer to toner particle formation can be carried out in an aqueous medium, which is advantageous in toner manufacture.

However, the styrene-acryl resin has disadvantage in that when a paper with a basis weight of from 200 to 350 g/m$^2$ is employed as a recording medium, it is poor in toner adhesion at a folded portion of the recoding medium, as compared with a toner comprising a polyester resin.

As is described above, the manufacture of a toner with both excellent productivity and excellent low temperature fixing ability has been difficult.

SUMMARY OF THE INVENTION

An object of the invention is to provide a toner for developing an electrostatic image having excellent productivity, excellent charging property and excellent low temperature fixing ability.

The toner for developing an electrostatic image of the invention (hereinafter also referred to as the toner of the invention) is comprised of toner particles, wherein the toner particles contain as a resin a polymer having a structural unit represented by the following formula 1, Formula 1

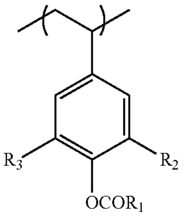

wherein $R_1$ represents an alkyl group having a carbon atom number of from 1 to 8, which may have a substituent; and $R_2$ and $R_3$ independently represent a hydrogen atom, —$OR_4$ or —$OCOR_5$, in which $R_4$ and $R_5$ independently represent an alkyl group having a carbon atom number of from 1 to 8, provided that at least one of $R_2$ and $R_3$ is —$OR_4$ or —$OCOR_5$.

DETAILED DESCRIPTION OF THE INVENTION

The above object of the invention can be attained by the following constitutions.

1. A toner for developing an electrostatic image, the toner being comprised of toner particles, wherein the toner particles contain as a resin a polymer having a structural unit represented by the following formula 1, Formula 1

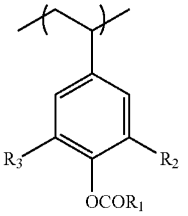

wherein $R_1$ represents an alkyl group having a carbon atom number of from 1 to 8, which may have a substituent; and $R_2$ and $R_3$ independently represent a hydrogen atom, —$OR_4$ or —$OCOR_5$, in which $R_4$ and $R_5$ independently represent an alkyl group having a carbon atom number of from 1 to 8, provided that at least one of $R_2$ and $R_3$ is —$OR_4$ or —$OCOR_5$.

2. The toner for developing an electrostatic image of item 1 above, wherein in formula 1, at least one of $R_2$ and $R_3$ is —$OR_4$.

3. The toner for developing an electrostatic image of item 1 above, wherein in formula 1, one of $R_2$ and $R_3$ is a hydrogen atom and the other is —$OCH_3$.

4. The toner for developing an electrostatic image of item 1 above, wherein in formula 1, $R_1$ represents an alkyl group having a carbon atom number of from 1 to 3.

5. The toner for developing an electrostatic image of item 1 above, wherein the polymer is one prepared by radical polymerization of a polymerizable monomer represented by the following formula 2, Formula 2

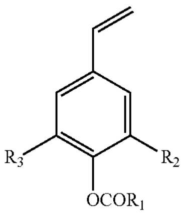

wherein $R_1$ represents an alkyl group having a carbon atom number of from 1 to 8, which may have a substituent; and $R_2$ and $R_3$ independently represent a hydrogen atom, —$OR_4$ or —$OCOR_5$, in which $R_4$ and $R_5$ independently represent an alkyl group having a carbon atom number of from 1 to 8, provided that at least one of $R_2$ and $R_3$ is —$OR_4$ or —$OCOR_5$.

6. The toner for developing an electrostatic image of item 1 above, wherein the polymer is a copolymer of a first monomer represented by the above formula 2 and a second monomer other than the first monomer, 7. The toner for developing an electrostatic image of item 6 above, wherein the content ratio by mass of the first monomer to the second monomer in the copolymer is from 6:4 to 9:1.

8. The toner for developing an electrostatic image of item 6 above, wherein the second monomer is a methacrylic acid ester or an acrylic acid ester.

9. The toner for developing an electrostatic image of item 8 above, wherein the second monomer is the acrylic acid ester, and the acrylic acid ester is n-butyl acrylate or 2-ethylhexyl acrylate.

10. The toner for developing an electrostatic image of item 1 above, wherein the polymer is a copolymer of a monomer represented by the above formula 2, an acrylic acid ester and a monomer having an ionic dissociation group, 11. The toner for developing an electrostatic image of item 10 above, wherein the acrylic acid ester is n-butyl acrylate or 2-ethylhexyl acrylate, and the monomer having an ionic dissociation group is acrylic acid or methacrylic acid.

12. The toner for developing an electrostatic image of item 1 above, wherein the toner particles have a volume-based median size of from 4 to 10 μm.

13. A manufacturing method of a toner for developing an electrostatic image, the method comprising the step of:

carrying out radical polymerization of a polymerizable monomer represented by the following formula 2, Formula 2

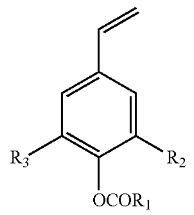

wherein $R_1$ represents an alkyl group having a carbon atom number of from 1 to 8, which may have a substituent; and $R_2$ and $R_3$ independently represent a hydrogen atom, —$OR_4$ or —$OCOR_5$, in which $R_4$ and $R_5$ independently represent an alkyl group having a carbon atom number of from 1 to 8, provided that at least one of $R_2$ and $R_3$ is —$OR_4$ or —$OCOR_5$, the toner being comprised of toner particles, wherein the toner particles contain as a resin a polymer having a structural unit represented by the following formula 1, Formula 1

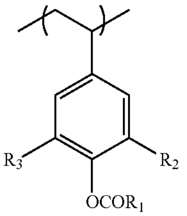

wherein $R_1$ represents an alkyl group having a carbon atom number of from 1 to 8, which may have a substituent; and $R_2$ and $R_3$ independently represent a hydrogen atom, —$OR_4$ or —$OCOR_5$, in which $R_4$ and $R_5$ independently represent an alkyl group having a carbon atom number of from 1 to 8, provided that at least one of $R_2$ and $R_3$ is —$OR_4$ or —$OCOR_5$.

EFFECT OF THE INVENTION

The above constitutions can provide a toner for developing an electrostatic latent image with excellent productivity, excellent charging property, high fixing ability at a folded portion and excellent low temperature fixing property.

In the invention, the toner for developing an electrostatic image containing a resin (hereinafter also referred to simply as toner) is featured in that the toner comprises, as the resin, a polymer having a structural unit represented by formula 1 above.

In the invention, the toner, comprising as a resin a polymer having a structural unit represented by formula 1, can provide a toner for developing an electrostatic latent image with excellent productivity, excellent charging property, high fixing ability at a folded portion and excellent low temperature fixing property.

(Structural Unit Represented by Formula 1)

In formula (1), $R_1$ represents an alkyl group having a carbon atom number of from 1 to 8, which may have a substituent; $R_2$ and $R_3$ independently represent a hydrogen atom, —$OR_4$ or —$OCOR_5$, in which $R_4$ and $R_5$ independently represent an alkyl group having a carbon atom number of from 1 to 8, which may have a substituent, provided that at least one of $R_2$ and $R_3$ is —$OR_4$ or —$OCOR_5$, i.e., $R_2$ and $R_3$ are not simultaneously hydrogen atoms.

$R_1$ represents an alkyl group having a carbon atom number of from 1 to 8, and preferably from 1 to 3. The carbon atom number of the alkyl group herein referred to is a carbon atom number in a straight chain portion of the alkyl group, and a carbon atom number of the longest straight chain portion in a branched alkyl group.

As the substituent, there is mentioned an alkyl group having a carbon atom number of from 1 to 7. The substituent is preferably an alkyl group having a carbon atom number of from 1 to 3.

The alkyl group of $R_4$ and $R_5$ of —$OR_4$ or —$OCOR_5$ represented by $R_2$ and $R_3$ represents the same alkyl group as denoted in $R_1$. The substituent is the same as denoted in $R_1$.

In formula (1), at least one of $R_2$ and $R_3$ is —$OR_4$ or —$OCOR_5$, and preferably —$OR_4$.

(Polymer Having Structural Unit Represented by Formula 1 Above)

The polymer having a structural unit represented by formula 1 (hereinafter also referred to as the polymer in the invention) can be prepared by carrying out polymerization or copolymerization of a polymerizable monomer (hereinafter also referred to as the polymerizable monomer in the invention) represented by formula 2 above which is a polymerizable monomer providing the structural unit represented by formula 1 above.

As the typical examples of the polymerizable monomer in the invention, there are mentioned the following Exemplified compounds M1 through M7.

M1

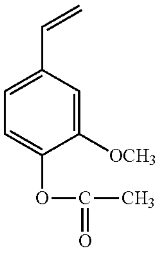

M2

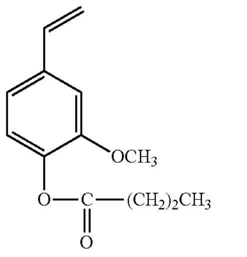

M3

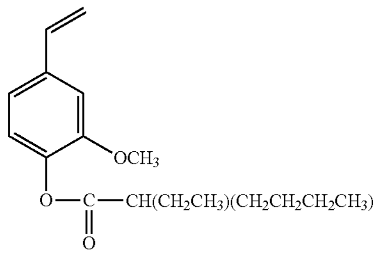

M4

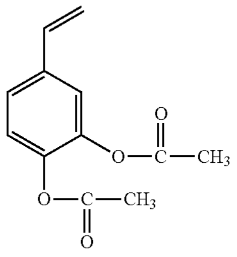

M5

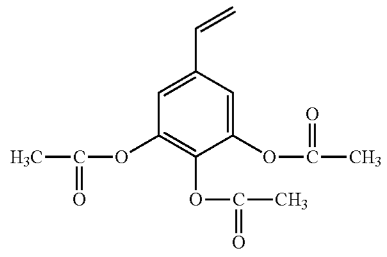

M6

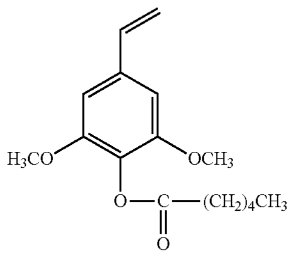

-continued

M7

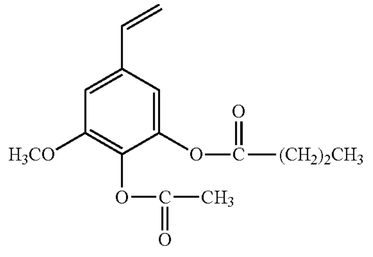

Exemplified compounds M1 through M4 and Exemplified compounds M6 and M7, each being typical examples of the polymerizable monomers in the invention, can be synthesized from a cinnamic acid derivative as a starting material.

They can be extracted from natural substances. For example, the synthesis process is described in Toshiaki Umezawa, “Mokuzai Kenkyu Shiryo, No. 26, 1-37 (1990). A cinnamic acid derivative such as caffeic acid, ferulic acid, 5-hydroxyferulic acid or sinapie acid is mixed with an equimolecular triethylamine as an organic base in a hydrophobic solvent such as octane, and heated to 80 to 120° C. to be decarboxylated, thereby producing a hydroxystyrene derivative. Subsequently, an organic acid or an organic acid anhydride corresponding to a material providing $—OCOR_1$ or $—OCOR_5$ in formula 1 above is added to the resulting solution, and heated at 110° C. for 5 hours, thereby obtaining the above Exemplified compounds.

As another synthetic method, a method employing a microorganism is known which performs decarboxylation reaction employing a microorganism having a decarboxylation activity on a hydroxystyrene derivative (refer to Yonemitsu et al., The Sixth Kosen Symposium, “Koen Yoshishu”, page 97 (2001)).

Hydroxystyrene derivative (4-hydroxy-3-methoxystyrene) can be manufactured from ferulic acid, employing bacteria belonging to genus *Bacillus* having a ferulic acid decarboxylation activity.

The hydroxyl group of the thus obtained hydroxystyrene derivative is esterified with a carboxylic acid as disclosed in Japanese Patent O.P.I. Publication No. 2009-57294 to prepare a stable radically polymerizable monomer.

The hydroxyl group of the hydroxystyrene derivative is reacted with a carboxylic acid anhydride to be esterified. For example, acetic anhydride is added to a 4-hydrophilic-3-methoxystyrene toluene solution, and heated at 110° C. The resulting solution is cooled, and washed with water and then with a saturated sodium carbonate aqueous solution. Subsequently, the organic phase of the solution is dried over magnesium sulfate, and the magnesium sulfate is filtered off. The filtrate was concentrated and distilled under reduced pressure to obtain 4-acetoxy-3-methoxystyrene.

It is preferred in markedly exhibiting the effects of the invention in view of environmental concern or productivity that particularly Exemplified compounds M1 through M3 are prepared from ferulic acid as a starting material which is derived from rice bran or rice bran oil. Particularly, toner containing a polymer obtained by polymerization of Exemplified compound M1, M2 or M3 provides excellent resistance to light.

Generally, ferulic acid is contained in plant seed such as corn. Ferulic acid can be efficiently manufactured by alkali hydrolysis of waste oil, the residue (rice bran pitch) after extraction of rice salad oil from rice bran (refer to Japanese Patent O.P.I. Publication No. 5-331101).

Exemplified compound M5 can be prepared by a process in which pyrogallol prepared by decarboxylation of gallic acid is reacted with 1-chloroacetic acid chloride, and then 1,2,3-trihydroxy cinnamic acid is prepared according to an ordinary method, and esterified with an organic acid.

The polymer in the invention can be obtained by polymerization of the monomer described above or by copolymerization of the monomer described above with another monomer. The (co)polymerization can be carried out employing a general polymerization reaction, but the polymer can be efficiently obtained particularly by radical polymerization.

As a polymerization initiator used in the polymerization, there are mentioned polymerization initiators including n-octyl-3-mercaptopropionate, azobisisobutyronitrile and a persulfate such as potassium persulfate.

In order to employ a polymer in toner, a polymer, after prepared, may be melt kneaded together with a colorant, pulverized and classified to obtain particles for toner. However, as described later, a method, in which polymerization of a monomer is carried out during manufacturing of toner, can be preferably applied in view of energy cost reduction during manufacturing of toner.

The polymer in the invention may be a homopolymer of the polymerizable monomer providing a structural unit represented by formula 1 (the polymerizable monomer in the invention), and is preferably a copolymer of the polymerizable monomer in the invention with another monomer as described later. When the polymer in the invention is the copolymer, the content ratio by mass of the polymerizable monomer in the invention to another monomer in the copolymer (the copolymerization ratio by mass of the polymerizable monomer in the invention to another monomer) is preferably from 6:4 to 9:1.

Examples of another monomer will be mentioned below.

Examples of another monomer include a styrene based monomer such as styrene, α-methylstyrene or o-acetoxy styrene; a methacrylic acid ester such as methyl methacrylate, ethyl methacrylate, n-butyl methacrylate, isopropyl methacrylate, isobutyl methacrylate, t-butyl methacrylate, n-octyl methacrylate, 2-ethylhexyl methacrylate, stearyl methacrylate, lauryl methacrylate, phenyl methacrylate, diethylaminoethyl methacrylate or dimethylaminoethyl methacrylate; and an acrylic acid ester such as methyl acrylate, ethyl acrylate, isopropyl acrylate, n-butyl acrylate, iso-butyl acrylate, n-octyl acrylate, 2-ethylhexyl acrylate, stearyl acrylate, lauryl acrylate or phenyl acrylate. Among these, n-butyl acrylate and 2-ethylhexyl acrylate are especially preferred.

It is preferred that a monomer having an ionic dissociation group is used as another polymerizable monomer in combination. The monomer having an ionic dissociation group is, for example, a monomer having a carboxyl group, a sulfonic acid group or a phosphoric acid group in the chemical structure, and typical examples thereof include acrylic acid, methacrylic acid, maleic acid, itaconic acid and fumaric acid. Among these, acrylic acid and methacrylic acid are especially preferred. The monomer having an ionic dissociation group is used in an amount of preferably from 2 to 7% (by mass) based on the total amount of monomers used.

It is especially preferred that the polymer in the invention is a copolymer of a polymerizable monomer represented by formula 2 above, an acrylic acid ester and a monomer having an ionic dissociation group. In this copolymer, the acrylic acid ester is preferably n-butyl acrylate or 2-ethylhexyl acrylate, and the monomer having an ionic dissociation group is preferably acrylic acid or methacrylic acid.

The polymer in the invention has a peak molecular weight of preferably from 3,500 to 20,000 and more preferably from 10,000 to 20,000, the peak molecular weight being obtained from a molecular weight distribution in terms of polystyrene measured by gel permeation chromatography (GPC).

The peak molecular weight refers to a molecular weight of a polymer eluted at elution time providing the peak top in the molecular weight distribution. When a plurality of molecular peaks are present, the peak molecular weight refers to a molecular weight of a polymer eluted at elution time providing the largest peak area.

The molecular weight is measured as follows. Employing an apparatus HLC-8220 (produced by TOSOH CORP.) and columns "TSK guard column and TSK gel Super HZM-M in 3 series" (produced by TOSOH CORP.), THF as a carrier (elution) solvent is passed through the columns at a column temperature of 40° C. and at a flow rate of 0.2 ml/min. A sample for measurement is treated in THF at room temperature for 5 minutes in an ultrasonic dispersing machine, dissolved in THF so as to have a concentration of 1 mg/ml, and filtered with a membrane filter of 0.2 μm pore size to obtain a sample solution. Then, 10 μl of this sample solution is injected with the elution solvent into the above apparatus, and the eluted solution is detected by a refractive index detector (an RI detector) to obtain a molecular weight distribution curve. The molecular weight of the sample is obtained from the molecular weight distribution curve.

Although the reason is not clear why the toner of the invention exhibits the effects of the invention that provides excellent charging property, high fixing ability at a folded portion and excellent resistance to light, it is considered to be as follows.

A conventional styrene-acryl resin toner, comprising a polymer containing as a main component a styrene unit (a component constituting the polymer) derived from styrene with a relatively high hydrophobicity, is insufficient in strength of its adhesion to a recording medium with a hydrophilic group on the surface thereof on account of the hydrophobicity of the styrene unit. On the other hand, in the toner of the invention comprising a polymer in which the benzene ring of the styrene unit has as a substituent an ester group as represented by $—OCOR_1$ or $—OCOR_5$ of formula 1 above, the ester group forms a hydrogen bonding with a recording medium with a hydrophilic group on the surface thereof; whereby the strength of adhesion of the toner to the recording material is increased to improve a fixing ability at a folded portion.

With respect to the charging property, the polymer in which the benzene ring of the styrene unit has as a substituent an ester group as represented by $—OCOR_1$ or $—OCOR_5$ of formula 1 above, can shorten a charging time at the initial stage, and suppress excessive charging after long term stirring and simultaneously occurring variation of image density.

When the toner of the invention is employed as a color toner, and particularly as a color toner containing a dye as a colorant, the resistance to light is greatly improved. This is considered to be due to the fact that the light absorbance at a wavelength of 300 nm of the polymer used in the toner of the invention is higher than that of polystyrene, and even when an image formed by the toner of the invention is placed outdoors, toner color fading or polymer deterioration due to ultraviolet light is suppressed.

(Manufacturing Method of Toner)

The toner manufacturing method of the invention is preferably one in which the polymerizable monomer represented by formula 2 is radically polymerized in an aqueous medium to form toner particles.

For example, the toner of the invention is preferably manufactured according to a method in which polymer particles are prepared by emulsion polymerization or mini-emulsion polymerization of a polymerizable monomer, and coagulation fused with a colorant, and optionally dispersion particles of a constitution material such as a fixing auxiliary or a releasing agent. For example, there are mentioned methods disclosed in Japanese Patent O.P.I. Publication Nos. 5-265252, 6-329947 and 9-15904.

The toner manufacturing method is applicable which employs the suspension polymerization disclosed in Japanese Patent O.P.I. Publication Nos. 2010-191043.

Herein, the "aqueous medium" refers to a medium containing not less than 50% by mass of water as a main component. Examples of components other than water in the aqueous medium include methanol, ethanol, isopropanol, butanol, acetone, methyl ethyl ketone and tetrahydrofuran. Among these, alcoholic solvents such as methanol, ethanol, isopropanol and butanol, which do not dissolve the polymer, are especially preferred.

The toner of the invention can contain, in addition to the polymer in the invention, a conventional styrene-acryl resin or a polyester resin obtained by polycondensation of a polyol and a polycarboxylic acid (for example, polyethylene terephthalate). The content in the toner of the polymer in the invention is preferably from 50 to 100% by mass, and more preferably from 70 to 100% by mass.

[Particle Size of Toner Particles]

The toner particles constituting the above toner have a volume-based median size of preferably from 4 to 10 μm, and more preferably from 5 to 9 μm.

The volume-based median size being within the above range provides high transfer efficiency, thereby improving the quality of a halftone-image, a narrow line image, and a dotted image.

The volume-based median size of the toner particles is measured and calculated via a measuring apparatus in which the COULTER MULTISIZER (produced by Beckman Coulter Inc.) is connected with a computer system for data processing (produced by Beckman Coulter Inc.).

Specifically, the above measurement is carried out as follows: 0.02 g of toner is added in 20 ml of a surfactant-containing solution (for example, a surfactant-containing solution obtained by diluting a surfactant-containing neutral detergent with pure water by a factor of 10, which is employed to disperse toner therein), and the resulting mixture is subjected to an ultrasonic dispersion for one minute to prepare a toner dispersion solution. Using a pipette, the toner dispersion solution is placed into a beaker containing ISOTON II (produced by Beckman Coulter Co.) within a sample stand, until the display concentration of the measuring apparatus reaches 5% to 10%.

The concentration falling within the above range can obtain reproducible measuring. In the measuring apparatus, the count number of the measuring particles is set to 25,000, the aperture size is set to 50 μm, and a frequency value is measured at 256 portions into which the measurement range of from 1 to 30 μm is divided. A particle size at 50% from a large size of a cumulative volume action is defined as a volume-based median size.

(External Additive)

The above described toner particles alone can constitute the toner of the invention, but in order to improve fluidity, charging property, cleaning property and the like, it is preferred that the toner of the invention have the constitution such that a so-called post-treatment agent such as an external additive, for example, a fluidity agent or a cleaning aid, is added to the toner particles.

Examples of the post-treatment agent include inorganic oxide particles such as silica particles, alumina particles and titanium oxide particles; inorganic stearic acid compound particles such as aluminum stearate particles and zinc stearate particles; and inorganic titanic acid compound particles such as strontium titanate particles and zinc titanate particles. These may be used singly or as an admixture of two or more kinds thereof.

It is preferable that these particles are subjected to surface treatment by a silane coupling agent, titanium coupling agent, higher fatty acid or silicone oil to improve heat-resistant storage stability and environmental stability.

The total amount of these various external additives to be added is preferably from 0.05 to 5 parts by mass, and more preferably from 0.1 to 3 parts by mass, with respect to 100 parts by mass of the toner. The external additives may be used as an admixture of two or more kinds thereof.

[Developer]

The toner of the invention may be used as a magnetic or non-magnetic single component developer, but may be used as a two-component developer mixed with a carrier.

In the case where the toner of the invention is used as the two-component developer, magnetic particles composed of known materials such as metals such as iron, ferrite and magnetite and alloys of the foregoing metal and a metal such as aluminum or lead can be used as the carrier. As the carrier, ferrite particles are especially preferred.

As the carrier, there may also be used a coated carrier in which the surface of the magnetic particles is covered with a covering agent such as resin, or a binder type carrier in which magnetic powder is dispersed in a binder resin.

Examples of the covering resin constituting the coated carrier, although not specifically limited, include, for example, an olefin resin, a styrene resin, a styrene-acryl resin, a silicone resin, an ester resin and a fluorine-contained resin. Known materials can be used without limitation as the resin constituting the resin dispersion type carrier, and examples thereof include a styrene-acryl resin, a polyester resin, a fluorine-contained resin, and a phenol resin.

A volume-based median size of the carrier is preferably 20 to 100 μm, and more preferably 20 to 60 μm. The volume-based median size of the carrier is typically determined by a laser diffraction particle size distribution analyzer provided with a wet disperser HELOS (produced by SYMPAIEC Co., Ltd.).

The toner particles constituting the toner of the invention can optionally contain a colorant, a charge control agent, magnetic powder or a releasing agent.

[Colorant]

Examples of a black colorant used for a black toner include carbon black, magnetic materials, and iron-titanium composite oxide black. Examples of the carbon black include channel black, furnace black, acetylene black, thermal black, and lamp black, and examples of the magnetic materials include ferrite and magnetite.

Examples of a yellow colorant used for a yellow toner include dyes such as C. I. Solvent Yellow 19, 44, 77, 79, 81, 82, 93, 98, 103, 104, 112 and 162; yellow pigments such as C. I. Pigment Yellow 14, 17, 74, 93, 94, 138, 155, 180 and 185; and a mixture thereof.

Examples of a magenta colorant used for a magenta toner include dyes such as C. I. Solvent Red 1, 49, 52, 58, 63, 111 and 122; pigments such as C. I. Pigment Red 5, 48:1, 53:1, 57:1, 122, 139, 144, 149, 166, 177, 178 and 222; and a mixture thereof.

Examples of a cyan colorant used for a cyan toner include dyes such as C. I. Solvent Blue 25, C. I. Solvent Blue 36, C.

I. Solvent Blue 60, C. I. Solvent Blue 70, C. I. Solvent Blue 93 and C. I. Solvent Blue 95; and cyan pigments such as C. I. Pigment Blue 1, 7, 15, 60, 62, 66 and 76.

In the invention, dyes are preferably used in the yellow toner, the magenta toner and the cyan toner in order to form an image with high colorfulness.

The content of the colorant in the toner particles is preferably from 0.5 to 20% by mass, and more preferably from 2 to 10% by mass.

[Magnetic Powder]

In the constitution such that the toner particles contain magnetic powder, for example, magnetite, γ-hematite or various kinds of ferrites can be used as the magnetic powder.

The content of the magnetic powder in the toner particles is preferably from 10 to 500 parts by mass, and more preferably 20 to 200 parts by mass, based on 100 parts by mass of the resin (polymer) in the toner particles.

[Charge Control Agent]

In the constitution such that the toner particles contain a charge control agent, substances, which are capable of providing a positive or negative charge via triboelectric charging, can be used without specific limitation as the charge control agent.

Typical examples of the positive charge control agent include a nigrosine dye such as NIGROSINE BASE EX (produced by Orient Chemical Industries Ltd.; a quaternary ammonium salt such as Quaternary Ammonium Salt P-51 (produced by Orient Chemical Industries Ltd.) or COPY CHARGE PX VP435 (produced by Hoechst Japan Co., Ltd.); and an imidazole compound such as alkoxylated amine, alkylamide, molybdic acid chelate pigment or PLZ-1001 (produced by Shikoku Chemicals Corp.). Typical examples of the negative charge control agent include a metal complex such as BONTRON S-22 (produced by Orient Chemical Industries Ltd.), BONTRON S-34 (produced by Orient Chemical Industries Ltd.), BONTRON E-81 (produced by Orient Chemical Industries Ltd.), BONTRON E-84 (produced by Orient Chemical Industries Ltd.) or SPILON BLACK TRH (produced by Hodogaya Chemical Co., Ltd.); a thioindigo pigment; a quaternary ammonium salt such as COPY CHARGE NX VP434 (produced by Hoechst Japan Co., Ltd.); a calixarene compound such as BONTRON E-89 (produced by Orient Chemical Industries Ltd.); a boron compound such as LR-147 (produced by Japan Carlit Co., Ltd.); and a fluorine-contained compound such as magnesium fluoride or carbon fluoride. As the metal complex other than the above used as the negative charge control agent, there are mentioned those having various structures such as an oxycarboxylic acid metal complex, a dicarboxylic acid metal complex, an amino acid metal complex, a diketone metal complex, a diamine metal complex, an azo group containing benzene-benzene derivative skeleton metal complex, and an azo group containing benzene-naphthalene derivative skeleton metal complex.

Thus, the toner particles containing such a charge control agent can improve the charging property of the toner.

The content of the charge control agent in the toner particles is preferably from 0.01 to 30% by mass, and more preferably from 0.1 to 10% by mass.

[Releasing Agent]

In the constitution such that the toner particles contain a releasing agent, various waxes can be used as the releasing agent. As the wax, polyolefin waxes such as a low molecular polypropylene or polyethylene and an oxidized polypropylene or polyethylene are preferably employed.

The content of the releasing agent in the toner particles is preferably from 1 to 30% by mass, and more preferably from 3 to 15% by mass.

[Image Formation Method]

The toner of the invention can be suitably employed in an image formation method comprising a fixing step using a heat and pressure fixing system in which heat and pressure are simultaneously applied. The toner can be suitably employed, particularly in an image formation method comprising a fixing step in which fixing is carried out at a relatively low fixing temperature such that the surface temperature of a heating member at a fixing nip portion is from 80 to 110° C. and preferably from 80 to 95° C.

Further, the toner can be also employed in an image formation method comprising a high speed fixing step such that the fixing line speed is from 200 to 600 ml/second.

The typical image formation method employing the toner as described above comprises the steps of developing a static latent image formed on a photoreceptor with the toner to form a toner image, transferring the toner image onto an image supporting material, and then fixing the transferred toner image to a recording material according to a heat and pressure fixing method, thereby obtaining a print with a visible image.

EXAMPLES

Next, the present invention will be explained referring to examples, but is not specifically limited thereto. In the examples, the terms "%" and "parts" represent "% by mass" and "parts by mass", respectively, unless otherwise specified.

Synthesis of a Monomer Represented by Formula 2

Preparation of 4-Hydroxy-3-Methoxycinnamic Acid (Ferulic Acid)

This is an example extracting the compound from rice bran.

Into a three-neck flask were introduced 10 parts by mass of a so-called pitch, blackish brown waste oil produced during manufacture of a rice fatty acid from rice bran. Then, 5 parts by mass of sodium hydroxide, 20 parts by mass of water and 16 parts by mass of isopropyl alcohol were added thereto, heated to 96° C., and stirred at that temperature for 8 hours. The resulting aqueous solution was cooled, and added with hexane, followed by removal of the hexane soluble substance. After that, the aqueous solution was added with a diluted sulfuric acid and acidified to precipitate ferulic acid (4-hydroxy-3-methoxycinnamic acid).

The precipitated ferulic acid was filtered off to obtain 1.2 parts by mass of crude ferulic acid with a purity of 80%. The crude ferulic acid was dissolved in 100° C. water, and recrystallized from the water to obtain a pure trans ferulic acid. The chemical structure of the resulting ferulic acid was confirmed according to NMR spectra and JR spectra.

Preparation of Acylated Hydroxystyrene Compound (4-Acetoxy-3-Methoxystyrene)

Subsequently, in order to prepare an acylated styrene derivative, 0.96 parts by mass of trans-ferulic acid obtained above and 10.8 parts by mass of acetic anhydride (an esterifying agent) were introduced in a three-neck flask, and reacted at 110° C. for 5 hours. The resulting reaction solution was cooled, washed with water, with a saturated sodium carbonate aqueous solution (three times) and then with a saturated sodium chloride. The organic phase of the solution was dried over magnesium sulfate, and the magnesium sulfate was filtered off. The filtrate was concentrated under reduced pressure, and distilled under reduced pressure to obtain purified 4-acetoxy-3-methoxystyrene (Exemplified compound M1).

Exemplified compounds M2 through M7 were prepared in the same manner as in Exemplified compound M1, employing a hydroxystyrene compound and an esterifying agent as shown in Table 1.

TABLE 1

| Exemplified Compound | Hydroxystyrene Compound | Esterifiying Agent | Remarks |
|---|---|---|---|
| M1 | 4-Hydroxy-3-Methoxystyrene | Acetic Anhydride | Inv. |
| M2 | 4-Hydroxy-3-Methoxystyrene | Butanoic Acid | Inv. |
| M3 | 4-Hydroxy-3-Methoxystyrene | 2-Ethyl-Hexanoic Acid | Inv. |
| M4 | 3,4-Dihydroxystyrene | Acetic Anhydride | Inv. |
| M5 | 3,4,5-Trihydroxystyrene | Acetic Anhydride | Inv. |
| M6 | 4-Hydroxy-3,5-Dimethoxystyrene | Butanoic Acid | Inv. |
| M7 | 3,4-Dihydroxy-5-Methoxystyrene | Acetic Anhydride, Butanoic Acid | Inv. |

Inv.: Inventive (Manufacture of Toner)

(Manufacture of Toner 1)

Manufacture Example 1 of Resin Particles for Toner

Preparation of Resin Particle Dispersion Solution Employing Exemplified Compound M1

Into a 5 liter stainless steel vessel (SUS vessel) equipped with a stirrer, a temperature sensor, a cooling tube and a nitrogen gas introducing apparatus placed was a surfactant solution, in which 8 g of sodium dodecyl sulfate were dissolved in a 3 liter ion exchange water, and then the resultant solution was heated to 80° C. while stirring at 230 rpm under nitrogen atmosphere.

After that, an initiator solution, in which 10 g of potassium persulfate were dissolved in a 200 g ion exchange water, was added to the surfactant solution, and then heated to 80° C. Subsequently, the monomer mixture solution as described later was dropwise added thereto over 100 minutes, and heated at 80° C. for additional two hours while stirring, whereby polymerization was carried out. Thus, a resin particle dispersion solution 1 was prepared.

Monomer Mixture Solution

| | |
|---|---|
| Exemplified compound M1 | 570 g |
| n-Butyl acrylate | 165 g |
| Methacrylic acid | 70 g |
| n-Octyl-3-mercaptopropionate | 5.5 g |

(Preparation of Colorant Dispersion Solution)

| | |
|---|---|
| Magenta dye (C.I. Solvent Red 49) | 10 parts |
| Anioic surfactant (Sodium dodecylbenzene sulfonate) | 1.5 parts |
| Ion exchange water | 90 parts |

The components above were mixed and dispersed in an SC mill to prepare a colorant dispersion solution containing a colorant particle with a volume-based median size of 153 nm. This colorant dispersion solution was designated as colorant dispersion solution 1.

(Preparation of Releasing Agent Dispersion Solution)

| | |
|---|---|
| Paraffin wax (with a melting point of 97° C.) | 100 parts |
| Sodium dodecylsulfate | 5 parts |
| Ion exchanged water | 240 parts |

The components above were mixed in a round shape flask made of stainless steel, dispersed for 10 minutes employing a homogenizer Ultra tarax T50 (produced by IKA Co., Ltd.), and subjected to dispersion treatment employing a pressure ejection type homogenizer. Thus, releasing agent dispersion solution 1 containing a releasing agent particle with a volume-based median size of 550 nm was prepared.

[Preparation of Toner Particles]

| | |
|---|---|
| Resin particle dispersion solution 1 | 234 parts |
| Colorant dispersion solution 1 | 22 parts |
| Releasing agent dispersion solution 1 | 40 parts |
| Polyaluminum chloride | 1.8 parts |
| Ion exchanged water | 600 parts |

The components above were mixed and dispersed in a round shape flask made of stainless steel, employing a homogenizer Ultra tarax T50 (produced by IKA Co., Ltd.), and then heated to 55° C. with stirring on an oil bath for heating. The resulting dispersion solution was further allowed to stand at 55° C. for 30 minutes. It was confirmed that aggregated particles with a volume-based median size (D50) of 4.8 μm were produced in the dispersion solution.

The dispersion solution was further heated on an oil bath for heating, and allowed to stand at 56° C. for 2 hours, wherein the volume-based median size (D50) of the particles was 5.9 μm.

After that, a 1 mol per liter sodium hydroxide aqueous solution was added to the dispersion solution to give a pH of 5.0. After the stainless steel flask was tightly sealed with a magnetic seal, the dispersion solution was heated to 98° C. while stirring and further stirred for additional 6 hours, thereby terminating fusion among the resin particles. Thus, a toner particle dispersion solution 1 containing particles with a volume-based median size (D50) of 6.0 μm was prepared.

(Washing and Drying Step)

The toner particle dispersion solution 1 was centrifuged using a basket-type centrifuge "MARK III MODEL NUMBER 60×40" (produced by Matsumoto Machine Co., Ltd.) to obtain a wet cake of toner particles.

The above wet cake was rinsed with ion exchange water at 45° C. using the above-described basket-type centrifuge until an electric conductivity of the filtrate reached 5 μS/cm. After that the rinsed wet cake was transferred to "FLUSH JET DRYER" (produced by Seishin Enterprise Co., Ltd.), followed by drying until the moisture content reached 0.5% by mass to prepare toner particles.

(External Additive Treatment of Toner Particles)

Hydrophobic silica (a number average primary particle size of 12 nm) of 1% by mass and 0.3% by mass of hydrophobic titania (with a number average primary particle size of 20 nm) were added to the toner particles obtained above, and mixed using a Henschel mixer. Thus, external additive treatment of the toner particles was carried out to obtain Toner 1.

(Manufacture of Toners 2 through 7)

Toners 2 through 7 were prepared in the same manner as Toner 1, except that exemplified compounds M2 through M7 were used as shown in Table 2 instead of exemplified compound M1

(Manufacture of Toner 8)

Toner 8 was prepared in the same manner as Toner 1, except that 350 g of exemplified compounds M1 and 220 g of styrene were used instead of 570 g of exemplified compound M1.

(Manufacture of Toner 9)

Toner 9 was prepared in the same manner as in Toner 1, except that a monomer mixture solution composed of 805 g of exemplified compound M2 and 5.5 g of n-octyl-3-mercapto-propionate was used instead of the monomer mixture solution used in preparation of the resin particle dispersion solution 1.

(Manufacture of Toner 10)

Toner 10 was prepared in the same manner as in Toner 9, except that exemplified compound M3 was used instead of exemplified compound M2.

(Manufacture of Toner 11)

| First Step Polymerization | |
|---|---|
| Exemplified compound M1 | 175 g |
| n-Butyl acrylate | 116 g |
| Methacrylic acid | 15 g |
| n-Octyl-3-mercaptopropionate | 7 g |

The components above were introduced in a 5 liter stainless steel vessel equipped with a stirrer, and 100 g of pentaerythritol tetrabehenic acid ester (wax) were added thereto and heated to 70° C. to prepare a monomer solution.

A surfactant solution in which 2 g of sodium dodecyl sulfate were dissolved in 1350 ml of ion exchanged water was heated to 70° C., and added to the monomer solution prepared above. The resulting solution was dispersed at 70° C. for 30 minutes via a mechanical dispersion apparatus "CLEARMIX" (produced by M-Technique Co., Ltd.) with a circulation pathway, thereby preparing a dispersion solution.

Subsequently, a polymerization initiator solution, in which 7.5 g of potassium persulfate were dissolved in 150 ml of ion exchanged water, was added to the above dispersion solution, and stirred at 78° C. for 1.5 hours to perform polymerization.

Successively, a polymerization initiator solution, in which 12 g of potassium persulfate were dissolved in 220 ml of ion exchanged water, was added to the above solution, and then, a monomer mixture solution described later was dropwise added thereto at 80° C. over one hour:

Monomer Mixture Solution

| | |
|---|---|
| Exemplified compound M1 | 285 g |
| n-Butyl acrylate | 214 g |
| Methacrylic acid | 35 g |
| n-Octyl-3-mercaptopropionate | 5.5 g |

After completion of the addition, the resultant solution was heated with stirring for additional two hours, and cooled to 28° C., to prepare a resin particle dispersion solution. This resin particle dispersion solution was designated as a resin particle dispersion solution 11. A resin obtained from the resin particle dispersion solution 11 was designated as a resin 11.

Toner 11 was prepared in the same manner as in Toner 1, except that a composition composed of 234 parts of the resin particle dispersion solution 11, 22 parts of colorant dispersion solution 1, 1.8 parts of polyaluminum chloride and 600 parts of ion exchanged water was used instead of the composition composed of the following components:

| | |
|---|---|
| Resin particle dispersion solution 1 | 234 parts |
| Colorant dispersion solution 1 | 22 parts |
| Releasing agent dispersion solution 1 | 40 parts |
| Polyaluminum chloride | 1.8 parts |
| Ion exchanged water | 600 parts |

(Manufacture of Toner 12)

| | |
|---|---|
| Exemplified compound M1 | 82 g |
| n-Butyl acrylate | 18 g |
| C.I. Pigment Red 122 (pigment) | 122 g |
| Di-t-butylsalicylic acid metal compound | 5 g |

The above components were mixed in an aqueous solution containing $Ca_3(PO_4)_2$, heated to 60° C. and uniformly dispersed with stirring at a 12,000 rpm in a TK Homomixer (produced by Tokushu Kikako Co., Ltd.). Thereafter, 10 g of 2,2'-azobis(2,4-dimethylvaleronitrile) as a polymerization initiator were added thereto to obtain a polymerizable monomer composition suspension solution. The resulting polymerizable monomer composition suspension solution was reacted. After reaction, the resulting suspension solution was cooled, added with hydrochloric acid to dissolve $Ca_3(PO_4)_2$, and filtered to obtain a residue. The residue was washed with water, dried and then subjected to external additive treatment in the same manner as in Toner 1. Thus, Toner 12 composed of toner particles with a volume-based median size of 6.5 μm was obtained.

(Manufacture of Toner 13)

The resin particle dispersion solution 1 prepared in the manufacture example 1 of resin particles for toner was subjected to centrifugal separation and the resulting residue was dried until the moisture content reached 0.4% by mass to prepare a resin 13.

[Preparation of Oil Phase I]

| | |
|---|---|
| Resin 13 | 115 parts |
| C.I. Solvent Red 49 | 10 parts |
| Paraffin Wax (with a melting point of 97° C.) | 33 parts |
| Ethyl acetate | 32 parts |

The oil phase having the above composition was prepared, and it was confirmed that the resin 13 was dissolved in the phase. The resulting oil phase was stirred at a rotation speed of 15000/min for 2 minutes in a homomixer ACE Homogenizer (produced by Nihon Seiki Co., Ltd.) to prepare a uniform oil phase.

[Preparation of Aqueous Phase]

(Calcium Carbonate Dispersion Solution)

| | |
|---|---|
| Calcium Carbonate (an average particle size of 0.03 μm) | 60 parts |
| Pure water | 40 parts |

The above components were stirred for 4 days in a ball mill.

[Manufacture of Toner]

| | |
|---|---|
| Oil phase I described above | 60 parts |
| Aqueous phase described above (Calcium carbonate dispersion solution) | 10 parts |

The above components were introduced in Colloid Mill (produced by Nihon Seiki Co., Ltd), and emulsified for 20 minutes at a gap clearance of 1.5 mm and at a rotation speed of 8000/min.

The resulting emulsion was introduced in a rotary evaporator and subjected to solvent removal treatment at room temperature for 3 hours under reduced pressure of 30 mmHg (1 mmHg corresponds to about 133 Pa).

The resulting aqueous dispersion solution was added with a 12N hydrochloric acid solution until the pH of the dispersion solution reached 2, whereby the calcium carbonate was completely removed from the toner particle surface.

Then, the resulting solution was added with a 10N sodium hydroxide solution until the pH of the solution reached 10, and stirred with a stirrer for one hour in an ultrasonic washing tank. The resulting solution was subjected to centrifugal sedimentation and the supernant was decanted. The residue was washed with water and subjected to centrifugal sedimentation, and the supernant was decanted. This process was repeated three times. After that, the residue was dried and subjected to external additive treatment in the same manner as in Toner 1. Thus, Toner 13 was obtained.

Toner 13 was composed of toner particles with a volume-based median size of 7.8 μm.

(Manufacture of Toner 14)

| | |
|---|---|
| Resin 13 | 1000 g |
| C.I. Solvent Red 49 | 80 g |
| Paraffin Wax (with a melting point of 97° C.) | 40 g |

The above components were pre-mixed, kneaded in a twin screw extruder (at a temperature at the ejection outlet of 140° C.), pulverized in an air stream type pulverizer, and classified employing an air stream type classifying apparatus, and subjected to external additive treatment in the same manner as in Toner 1. Thus, toner 14 composed of toner particles with a volume-based median size of 7.5 μm was obtained.

(Manufacture of Comparative Toner CT1)

Comparative toner CT1 was prepared in the same manner as in toner 1, except that styrene in the same amount as exemplified compound M1 was used instead of exemplified compound M1.

(Manufacture of Comparative Toner CT2)

Comparative toner CT2 was prepared in the same manner as in tonernl, except that p-acetoxystyrene in the same amount as Exemplified compound M1 was used instead of Exemplified compound M1.

TABLE 2

| Toner No. | Exemplified Compound or Comparative Monomer used | Polymer or Copolymer (Polymerization Method, etc.) | Remarks |
|---|---|---|---|
| 1 | M1 | BA-Containing Copolymer (Emulsion Association Method) | Inv. |
| 2 | M2 | BA-Containing Copolymer (Emulsion Association Method) | Inv. |
| 3 | M3 | BA-Containing Copolymer (Emulsion Association Method) | Inv. |
| 4 | M4 | BA-Containing Copolymer (Emulsion Association Method) | Inv. |
| 5 | M5 | BA-Containing Copolymer (Emulsion Association Method) | Inv. |
| 6 | M6 | BA-Containing Copolymer (Emulsion Association Method) | Inv. |
| 7 | M7 | BA-Containing Copolymer (Emulsion Association Method) | Inv. |
| 8 | M1 | St-Containing Copolymer (Emulsion Association Method) | Inv. |
| 9 | M2 | Homopolymer (Emulsion Association Method) | Inv. |
| 10 | M3 | Homopolymer (Emulsion Association Method) | Inv. |
| 11 | M1 | BA-Containing Copolymer Two Step Polymerization in the presence of Wax (Emulsion Association Method) | Inv. |
| 12 | M1 | BA-Containing Copolymer (Suspension Polymerization Toner) | Inv. |
| 13 | M1 | BA-Containing Copolymer (Drying after Suspension Polymerization) | Inv. |
| 14 | M1 | BA-Containing Copolymer (Drying, kneading and pulverizing after Suspension Polymerization) | Inv. |
| CT1 | CF1 | BA-Containing Copolymer (Emulsion Association Method) | Comp. |
| CT2 | CF2 | BA-Containing Copolymer (Emulsion Association Method) | Comp. |

Inv.: Inventive;
Comp.: Comparative
CF1: Styrene;
CF2: p-Acetoxystyrene;
BA: Butyl acrylate;
St: Styrene (Preparation of Two-Component Developer)

One hundred parts by mass of ferrite particles with a volume-based median size of 50 μm (Produced by Powder Tec Co., Ltd.) and 4 parts by mass of methyl methacrylate-cyclohexyl methacrylate copolymer with a primary particle volume-based median size of 85 nm were introduced in a high speed stirring apparatus with a horizontal stirring blade, and mixed while stirring at 30° C. at a stirring blade rotation speed of 8 m/second for 15 minutes. The resulting mixture was then heated to 120° C., stirred for additional 4 hours, then cooled and sieved with a 200 mesh sieve to remove the free methyl methacrylate-cyclohexyl methacrylate copolymer. Thus, a resin-covered carrier was prepared.

The resin-covered carrier and each of toners 1 through 14 and comparative toners CT1 and CT2 were mixed to give a toner content of 7% by mass. Thus, two-component developers 1 through 14 and comparative two-component developers CD1 and CD2 were prepared.

(Evaluation)

With respect to two-component developers 1 through 14 and comparative two-component developers CD1 and CD2 obtained above, the following evaluations (1), (2) and (3) were carried out.

(1) Low temperature Fixing Ability

As an image formation apparatus, a commercially available multi functional printer "bizhub PRO C6500" (produced by Konica Minolta Business Technologies Co., Ltd.) was employed, in which the developing tank was charged with each of the two-component developers 1 through 14 and the comparative two-component developers CD1 and CD2 obtained above. Using the above printer, a solid image with an image density of 0.8 was formed as a visible image on a paper with a basis weight of 350 g/m$^2$ as a recording medium at ordinary temperature and at ordinary humidity (at 20° C. and at 50% RH), the surface temperature of the heat fixing member in the heat roller fixing being varied at an interval of 5° C. in a temperature range of from 80 to 150° C.

After that, the solid image portion was folded employing a folding apparatus. The folded portion, after blown with a 0.35 MPa air, was observed referring to standard samples, and evaluated according to the following five evaluation criteria, rankings 5 through 1. The fixing temperature of ranking 3 was defined as the lowest fixing temperature.

Ranking 5: No toner separation was observed at the folded portion.

Ranking 4: A slight toner separation was observed along the folded portion.

Ranking 3: Toner separation was observed in a thin line form along the folded portion.

Ranking 2: Toner separation was observed in a thick line form along the folded portion.

Ranking 1: Apparent toner separation was observed at the folded portion.

When the lowest fixing temperature showing ranking 3 is not higher than 130° C., it exhibits a sufficient low temperature fixing ability.

(2) Charge Rising Property

Twenty grams of the two-component developers obtained were placed in a 20 ml glass vessel, stored at room temperature for one week, and then vibrated for 1 minute at an vibration angle of 45° C., at an arm length of 50 cm and at a vibration speed of 200/minute. Then, 1 g of the resulting developer was taken out and the charged amount thereof was determined according to a blow-off method.

The developer sample was further vibrated for additional 120 minutes in the same manner as above, and the charged amount thereof was determined in the same manner as above. When a charged amount obtained by subtracting the charged amount of the sample after one minute vibration from that after one hundred and twenty minute vibration was less than 8 μC/g, the sample was judged as acceptable. Herein, the determination was carried out at a 10° C. and at 10% RH.

(3) Resistance to Light

With respect to each toner, a solid image with a toner deposition amount of 4 ($g/m^2$) was formed and exposed to a 70,000 lux xenon arc lamp at 44.0° C. for 14 days, employing a xenon long life weather meter produced by Suga Test Instruments Co., Ltd. The chromaticities of the solid images before and after the exposure were measured according to Macbeth Color Eye 7000, and the color difference computed by CMC (2:1) color difference formula was evaluated.

A solid image, in which the difference between chromaticities before and after exposure is small, i.e., the color difference is small, is excellent in resistance to light. In the invention, the color difference ΔE of 3 shows a limit capable of being visually discriminated, and the color difference ΔE of not more than 3 was evaluated as being good in resistance to light.

The results are shown in Table 3.

TABLE 3

| Toner No. | Lowest Fixing Temperature (° C.) | Charge Rising Property (μC/g) | Resistance to Light | Remarks |
|---|---|---|---|---|
| 1 | 110 | 1.9 | 1.1 | Inv. |
| 2 | 105 | 1.8 | 1.2 | Inv. |
| 3 | 95 | 1.8 | 1.2 | Inv. |
| 4 | 120 | 6.4 | 1.8 | Inv. |
| 5 | 115 | 5.3 | 2.2 | Inv. |
| 6 | 125 | 4.8 | 2.1 | Inv. |
| 7 | 120 | 5.2 | 2.1 | Inv. |
| 8 | 125 | 7.7 | 2.8 | Inv. |
| 9 | 110 | 2.8 | 0.8 | Inv. |
| 10 | 105 | 3.1 | 0.7 | Inv. |
| 11 | 105 | 2.5 | 1.1 | Inv. |
| 12 | 115 | 4.4 | 1.5 | Inv. |
| 13 | 115 | 5.2 | 1.6 | Inv. |
| 13 | 115 | 6.1 | 1.6 | Inv. |
| CD1 | 135 | 9.0 | 3.5 | Comp. |
| CD2 | 132 | 8.2 | 3.2 | Comp. |

Inv.: Inventive;

Comp.: Comparative

As is apparent from Table 3, the inventive toners 1 through 14, comprising the polymer having a structural unit represented by formula 1 provide excellent low temperature fixing property, excellent charging property and excellent resistance to light, as compared with comparative toner CT1 comprising a polymer having a styrene unit or comparative toner CT2 comprising a p-acetoxystyrene unit.

What is claimed is:

1. A toner for developing an electrostatic image, the toner being comprised of toner particles, wherein the toner particles contain as a resin a polymer having a structural unit represented by the following formula 1, Formula 1

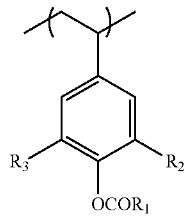

wherein $R_1$ represents an alkyl group having a carbon atom number of from 1 to 8, which may have a substituent; and $R_2$ and $R_3$ independently represent a hydrogen atom, $-OR_4$ or $-OCOR_5$, in which $R_4$ and $R_5$ independently represent an alkyl group having a carbon atom number of from 1 to 8, provided that at least one of $R_2$ and $R_3$ is $-OR_4$ or $-OCOR_5$.

2. The toner for developing an electrostatic image of claim 1, wherein in formula 1, at least one of $R_2$ and $R_3$ is $-OR_4$.

3. The toner for developing an electrostatic image of claim 1, wherein in formula 1, one of $R_2$ and $R_3$ is a hydrogen atom and the other is $-OCH_3$.

4. The toner for developing an electrostatic image of claim 1, wherein in formula 1, $R_1$ represents an alkyl group having a carbon atom number of from 1 to 3.

5. The toner for developing an electrostatic image of claim 1, wherein the polymer is one prepared by radical polymerization of a polymerizable monomer represented by the following formula 2, Formula 2

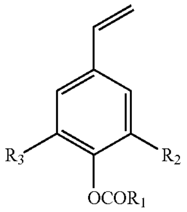

wherein $R_1$ represents an alkyl group having a carbon atom number of from 1 to 8, which may have a substituent; and $R_2$ and $R_3$ independently represent a hydrogen atom, —$OR_4$ or —$OCOR_5$, in which $R_4$ and $R_5$ independently represent an alkyl group having a carbon atom number of from 1 to 8, provided that at least one of $R_2$ and $R_3$ is —$OR_4$ or —$OCOR_5$.

6. The toner for developing an electrostatic image of claim 1, wherein the polymer is a copolymer of a first monomer represented by the following formula 2 and a second monomer other than the first monomer, Formula 2

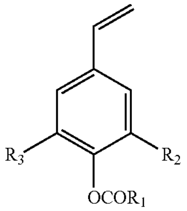

wherein $R_1$ presents an alkyl group having a carbon atom number of from 1 to 8, which may have a substituent; and $R_2$ and $R_3$ independently represent a hydrogen atom, —$OR_4$ or —$OCOR_5$, in which $R_4$ and $R_5$ independently represent an alkyl group having a carbon atom number of from 1 to 8, provided that at least one of $R_2$ and $R_3$ is —$OR_4$ or —$OCOR_5$.

7. The toner for developing an electrostatic image of claim 6, wherein the content ratio by mass of the first monomer to the second monomer in the copolymer is from 6:4 to 9:1.

8. The toner for developing an electrostatic image of claim 6, wherein the second monomer is a methacrylic acid ester or an acrylic acid ester.

9. The toner for developing an electrostatic image of claim 8, wherein the second monomer is the acrylic acid ester, and the acrylic acid ester is n-butyl acrylate or 2-ethylhexyl acrylate.

10. The toner for developing an electrostatic image of claim 1, wherein the polymer is a copolymer of a monomer represented by the following formula 2, an acrylic acid ester and a monomer having an ionic dissociation group, Formula 2

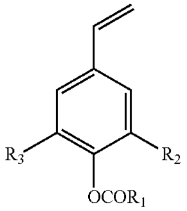

wherein $R_1$ represents an alkyl group having a carbon atom number of from 1 to 8, which may have a substituent; and $R_2$ and $R_3$ independently represent a hydrogen atom, —$OR_4$ or —$OCOR_5$, in which $R_4$ and $R_5$ independently represent an alkyl group having a carbon atom number of from 1 to 8, provided that at least one of $R_2$ and $R_3$ is —$OR_4$ or —$OCOR_5$.

11. The toner for developing an electrostatic image of claim 10, wherein the acrylic acid ester is n-butyl acrylate or 2-ethylhexyl acrylate, and the monomer having an ionic dissociation group is acrylic acid or methacrylic acid.

12. The toner for developing an electrostatic image of claim 1, wherein the toner particles have a volume-based median size of from 4 to 10 μm.

13. A manufacturing method of a toner for developing an electrostatic image, the method comprising the step of:

carrying out radical polymerization of a polymerizable monomer represented by the following formula 2, Formula 2

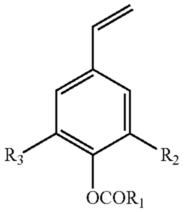

wherein $R_1$ represents an alkyl group having a carbon atom number of from 1 to 8, which may have a substituent; and $R_2$ and $R_3$ independently represent a hydrogen atom, —$OR_4$ or —$OCOR_5$, in which $R_4$ and $R_5$ independently represent an alkyl group having a carbon atom number of from 1 to 8, provided that at least one of $R_2$ and $R_3$ is —$OR_4$ or —$OCOR_5$, the toner being comprised of toner particles, wherein the toner particles contain as a resin a polymer having a structural unit represented by the following formula 1, Formula 1

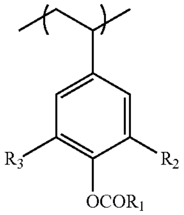

wherein $R_1$ represents an alkyl group having a carbon atom number of from 1 to 8, which may have a substituent; and $R_2$ and $R_3$ independently represent a hydrogen atom, —$OR_4$ or —$OCOR_5$, in which $R_4$ and $R_5$ independently represent an alkyl group having a carbon atom number of from 1 to 8, provided that at least one of $R_2$ and $R_3$ is —$OR_4$ or —$OCOR_5$.

* * * * *